(12) United States Patent
Zhuo et al.

(10) Patent No.: US 11,048,913 B2
(45) Date of Patent: Jun. 29, 2021

(54) FOCUSING METHOD, DEVICE AND COMPUTER APPARATUS FOR REALIZING CLEAR HUMAN FACE

(71) Applicant: GUANGDONG OPPO MOBILE TELECOMMUNICATIONS CORP., LTD., Guangdong (CN)

(72) Inventors: Shijie Zhuo, Guangdong (CN); Xiaopeng Li, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/622,176

(22) PCT Filed: Jun. 11, 2018

(86) PCT No.: PCT/CN2018/090626
§ 371 (c)(1),
(2) Date: Dec. 12, 2019

(87) PCT Pub. No.: WO2018/228330
PCT Pub. Date: Dec. 20, 2018

(65) Prior Publication Data
US 2020/0125831 A1    Apr. 23, 2020

(30) Foreign Application Priority Data

Jun. 16, 2017  (CN) .................. 201710458963.X

(51) Int. Cl.
*G06K 9/00* (2006.01)
*G06K 9/32* (2006.01)
*H04N 5/232* (2006.01)

(52) U.S. Cl.
CPC ....... *G06K 9/00228* (2013.01); *G06K 9/3233* (2013.01); *H04N 5/23212* (2013.01); *H04N 5/23219* (2013.01)

(58) Field of Classification Search
CPC ............. G06K 9/00228; G06K 9/3233; H04N 5/23212; H04N 5/23219; H04N 5/232127
See application file for complete search history.

(56) References Cited

U.S. PATENT DOCUMENTS 8,098,903 B2 * 1/2012 Fukushi ............. G06K 9/00255
382/118
2006/0104487 A1   5/2006 Porter et al.
(Continued)

FOREIGN PATENT DOCUMENTS

CN      102338972       2/2012
CN      104125395       10/2014
(Continued)

OTHER PUBLICATIONS

WIPO, ISR for PCT/CN2018/090626, dated Aug. 29, 2018.
(Continued)

*Primary Examiner* — Yogesh K Aggarwal
(74) *Attorney, Agent, or Firm* — Hodgson Russ LLP

(57) ABSTRACT

The disclosure discloses a focusing method, device, and computer apparatus for realizing a clear human face. The focusing method includes: acquiring first position information of a human face in a current frame of an image to be captured by performing face recognition on the image, after a camera finishing focusing; acquiring second position information of the human face in a next frame, before shooting the image; determining whether a position of the human face changes, based on the first and second position information;
(Continued)

resetting an ROI of the human face when it changes; and refocusing on the human face based on the ROI. The disclosure can track the human face in real-time, and trigger the camera to refocus after the human face deviates from a previous focusing position, thereby to make the human face in the captured photograph clear.

20 Claims, 6 Drawing Sheets

(56) References Cited

U.S. PATENT DOCUMENTS

| | | | |
|---|---|---|---|
| 2008/0122939 A1* | 5/2008 | Hirai | H04N 5/23212 348/222.1 |
| 2008/0158407 A1 | 7/2008 | Funamoto | |
| 2008/0205870 A1 | 8/2008 | Ueda | |
| 2009/0002516 A1* | 1/2009 | Suzuki | H04N 5/232945 348/223.1 |
| 2016/0155079 A1* | 6/2016 | Nielsen | G06F 15/16 705/7.41 |

FOREIGN PATENT DOCUMENTS

| | | |
|---|---|---|
| CN | 104954695 | 9/2015 |
| CN | 105007426 | 10/2015 |
| CN | 106170064 | 11/2016 |
| CN | 106385542 | 2/2017 |
| CN | 107302658 | 10/2017 |
| EP | 1760522 | 3/2007 |
| EP | 3089449 | 11/2016 |
| JP | 2007279601 | 10/2007 |
| WO | 2007142621 | 12/2007 |
| WO | 2016144532 | 9/2016 |

OTHER PUBLICATIONS

SIPO, First Office Action for CN Application No. 201710458963.X, dated Apr. 3, 2019.
EPO, Office Action for EP Application No. 18816534.4, dated Feb. 14, 2020.
EPO, Office action for EP Application No. 18816534.4, dated Nov. 18, 2020.
IPI, Office Action for IN Application No. 201917053239, dated Mar. 19, 2021.

* cited by examiner

FOCUSING METHOD, DEVICE AND COMPUTER APPARATUS FOR REALIZING CLEAR HUMAN FACE

CROSS-REFERENCE TO RELATED APPLICATION(S)

This application is a U.S. national phase of International Application No. PCT/CN2018/090626, filed Jun. 11, 2018, which claims priority to Chinese Application No. 201710458963.X, filed Jun. 16, 2017. The entire disclosures of the above-mentioned applications are incorporated by reference herein.

TECHNICAL FIELD

The present disclosure relates to the field of camera technologies, and more particular, to a focusing method, device, and computer apparatus for realizing a clear human face.

BACKGROUND

After a camera finishes focusing, if an image to be captured does not greatly shake, the camera is not triggered to refocus in the related art. If there is a human face in the image to be captured, when a position of the human face changes, such as a movement or a shaking of the human face at front, back, left and right, and the image to be captured substantially remain unchanged, the camera will not be triggered to refocus. This causes a problem that, if the position of the human face in the image to be captured changes and the camera does not trigger refocusing, since the human face has deviated from the position of focusing, the human face in the captured image is blurred.

SUMMARY

The disclosure aims to solve at least one of the technical problems in the related art to some extent.

A first object of the disclosure is to provide a focusing method for realizing a clear human face, to track the human face in real time, and to trigger a camera to perform refocusing after a position of the human face deviates from a previous focus position, thereby enabling the human face of a captured image is clear.

A second object of the disclosure is to provide a focusing device for realizing a clear human face.

A third object of the disclosure is to provide a computer apparatus.

A fourth object of the disclosure is to provide a non-transitory computer readable storage medium.

A fifth object of the disclosure is to provide a computer program product.

In order to achieve the above objects, a first aspect of an embodiment of the disclosure provides a focusing method for realizing a clear human face, which includes: focusing method for realizing a clear human face, comprising: acquiring first position information of a human face in a current frame of an image to be captured by performing face recognition on the image to be captured, after a camera finishing focusing; acquiring second position information of the human face in a next frame after the current frame, before shooting the image to be captured; determining whether a position of the human face changes, according to the first position information and the second position information; resetting a region of interest (ROI) of the human face when the position of the human face changes; and refocusing the human face based on the ROI.

In the focusing method for realizing a clear human face, when the camera finishes focusing, an image to be captured is subjected to face recognition, and first position information of a human face in a current frame of the image to be captured is acquired. Before shooting, second position information of the human face in a next frame after the current frame is obtained, and it is determined that the position of the human face changes or not according to the first position information and the second position information. When the position of the human face changes, the ROI of the human face is reset based on the second position information, and the human face is refocused based on the ROI of the human face, so that the human face can be tracked in real-time, and after the position of the human face deviates from a previous focusing position, the camera is triggered to refocus thereby to make the human face in a captured photo being clear.

In order to achieve the above objects, a second aspect of an embodiment of the disclosure provides a focusing device for realizing a clear human face, which includes: an acquiring module, configured to acquire first position information of a human face in a current frame of an image to be captured by performing face recognition on the image to be captured, after a camera finishing focusing; and configured to acquire second position information of the human face in a next frame after the current frame, before shooting the image to be captured; a determining module, configured to determine whether a position of the human face changes, according to the first position information and the second position information acquired by the acquiring module; a setting module, configured to reset an ROI of the human face when the position of the human face is determined to be changed by the determining module; and a focusing module, configured to focus the human face based on the ROI set by the setting module.

In the focusing device for realizing a clear human face, when the camera finishes focusing, an image to be captured is subjected to face recognition, and first position information of a human face in a current frame of the image to be captured is acquired by the acquiring module. Before shooting the image to be captured, second position information of the human face in a next frame of the image to be captured is obtained, and the position of the human face changes or not is determined by the determining module, according to the first position information and the second position information. When the position of the human face changes, the ROI of the human face is reset by the setting module, according to the second position information, and the human face is refocused by the focusing module, according to the ROI of the human face. So, the human face can be tracked in real-time, and after the position of the human face deviates from a previous focusing position, the camera is triggered to refocus thereby to make the human face in a captured photo clear.

In order to achieve the above objects, a second aspect of an embodiment of the disclosure provides a computer apparatus, which includes a memory, a processor, and a computer program stored in the memory and executable by the processor, the above method is implemented when executing the computer program.

In order to achieve the above objects, a second aspect of an embodiment of the disclosure provides a non-temporary computer-readable storage medium, which has a computer program stored therein, the above method is implemented when executing the computer program.

In order to achieve the above objects, a second aspect of an embodiment of the disclosure provides a computer program product, the above method is implemented when instructions in the computer program product are executed by a processor.

Additional aspects and advantages of the disclosure will be described in the following description, and will become apparent from the following description or will be understood through the practice of the disclosure.

BRIEF DESCRIPTION OF THE DRAWINGS

In order to more clearly illustrate the technical solutions in the embodiments of the disclosure, the drawings used in the description of the embodiments are briefly described below. It is obvious that the drawings below are just refers to some embodiments of the disclosure, and other drawings can also be obtained for those skilled in the art based on these drawings without paying any creative effort.

DETAILED DESCRIPTION OF PREFERRED EMBODIMENTS

The technical solutions in the embodiments of the disclosure will be clearly and completely described in the following with reference to the accompanying drawings of the embodiments. It is apparent that the embodiments described below are just some embodiments of the disclosure but not all of the embodiments of the disclosure. All other embodiments obtained by a person of ordinary skill in the art, based on the embodiments of the disclosure without creative efforts, are within the scope of the present disclosure.

Figure 1:
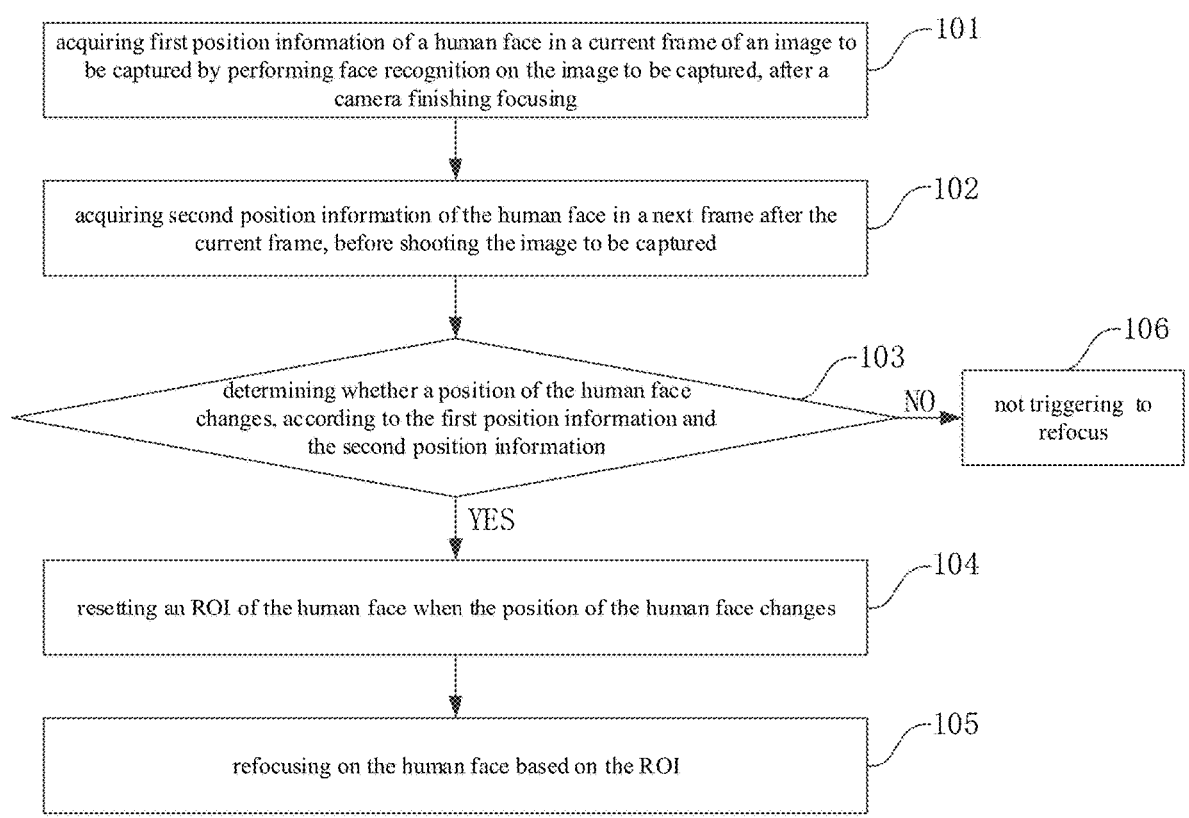
FIG. 1 is a flowchart of a focusing method for realizing a clear human face according to an embodiment of the disclosure.

FIG. 1 is a flowchart of a focusing method for realizing a clear human face according to an embodiment of the disclosure. As illustrated in FIG. 1, the focusing method for realizing a clear human face focus may include the following steps.

Step 101, when a camera finishes focusing, face recognition is performed on an image to be captured, thereby acquiring first position information of a human face in a current frame of the image to be captured.

In the embodiment, after determining that the image to be captured includes a human face by performing face recognition on the image when the camera finishes focusing, the human face is checked to acquire the first position information of the human face in the current frame of the image to be captured. The first position information is the location information of an area where the human face is located in the current frame.

Step 102, before shooting the image to be captured, second position information of the human face in a next frame after the current frame is acquired.

In the embodiment, after focusing and before capturing the image to be captured, the second position information of the human face in the next frame after the current frame is further acquired. The second position information is the location information of an area where the human face is located in the next frame after the current frame.

Step 103, it is determined whether the position of the human face is changed or not, according to the first location information and the second location information.

If yes, that is, the position of the human face changes, a step 104 is performed; if not, that is, the position of the human face does not change, a step 106 is performed.

Step 104, a region of interest (ROI) of the human face is reset.

Specifically, in the embodiment, an operation of resetting the ROI of the human face may be: resetting the ROI of the human face according to the second position information.

Step 105, the human face is subjected to a focusing operation according to the ROI.

In the embodiment, if it is determined that the position of the human face changes according to the first position information and the second position information, the camera may be triggered to perform a refocusing operation. Specifically, the ROI of the human face may be reset according to the second position information, and then the human face is subjected to a focusing operation according to the ROI of the human face.

In the embodiment, a focusing mode may be a phase focusing, or a contrast focusing, or a combination of the phase focusing and the contrast focusing, the focusing mode adopted is not limited.

Step 106, the refocusing operation is not triggered.

In the embodiment, if it is determined that the position of the human face does not change according to the first position information and the second position information, the camera may not be triggered to refocus.

In the above-mentioned focusing method for realizing a clear human face, when the camera finishes focusing, an image to be captured is subjected to face recognition, and first position information of a human face in a current frame of the image to be captured is acquired. Before shooting, second position information of the human face in a next frame after the current frame is obtained, and it is determined that the position of the human face changes or not according to the first position information and the second position information. When the position of the human face changes, the ROI of the human face is reset according to the second position information, and the human face is refocused according to the ROI of the human face, so that the human face can be tracked in real-time, and after the position of the human face deviates from a previous focusing position, the camera is triggered to refocus thereby to make the human face in a captured photo being clear.

Figure 2:
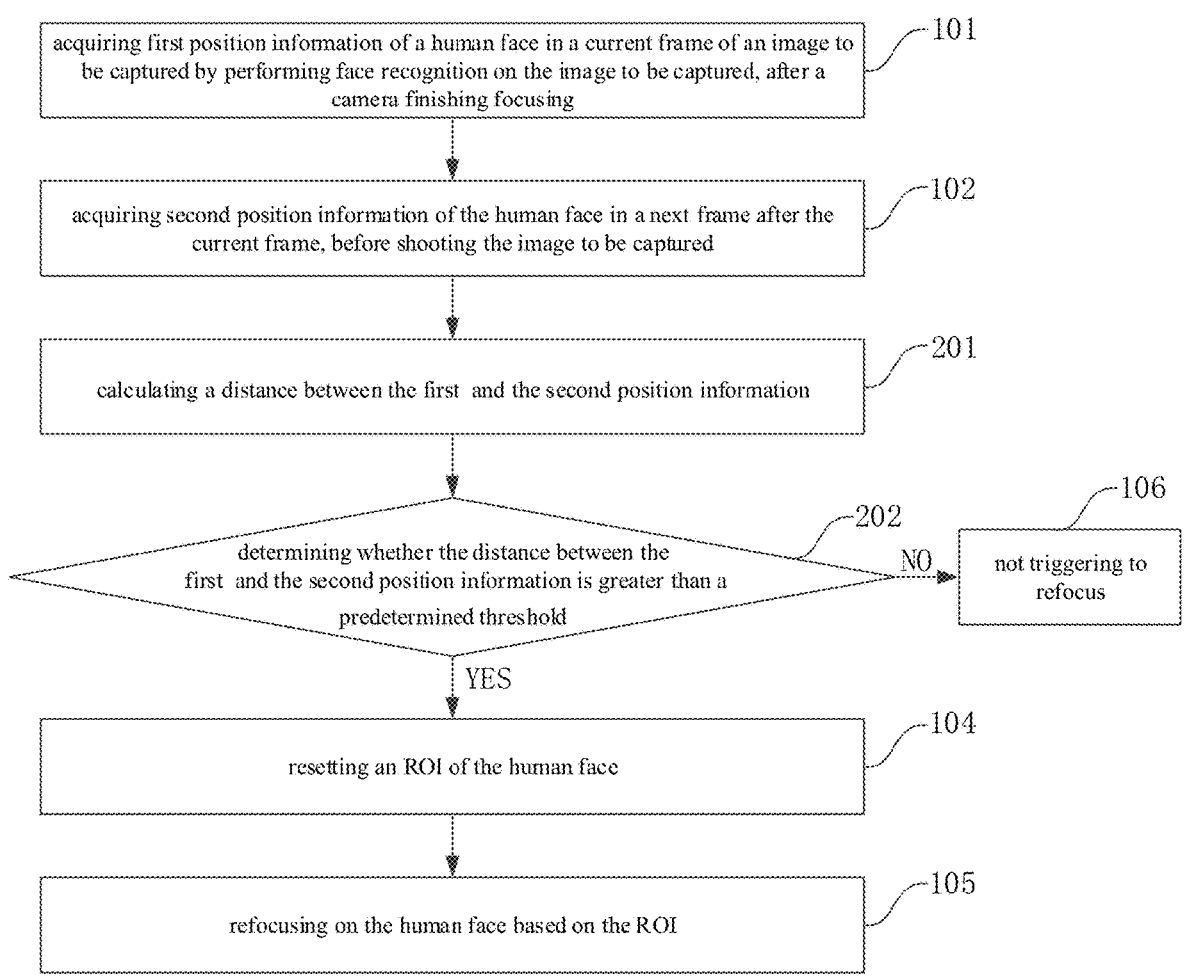
FIG. 2 is a flowchart of a focusing method for realizing a clear human face according to another embodiment of the disclosure.

FIG. 2 is a flowchart of a focusing method for realizing a clear human face according to another embodiment of the disclosure. As illustrated in FIG. 2, the step 103 of the embodiment as illustrated in FIG. 1 may include the following steps.

Step 201, a distance between the first position information and the second position information is calculated.

Step 202, it is determined whether the distance between the first position information and the second position information exceeds a predetermined threshold.

As such, the position of the human face changes may refer to that: the distance between the first position information and the second position information exceeds the predetermined threshold.

The predetermined threshold may be predetermined according to system performance and/or implementation requirements, for example, the predetermined threshold may be 0. In this case, as long as the position of the human face changes slightly, the camera will be triggered to refocus. In other cases, the predetermined threshold may also be a positive integer, when the position of the human face moves slightly, the camera will not be triggered to refocus. The specific numerical value of the predetermined threshold is not limited.

Figure 3:
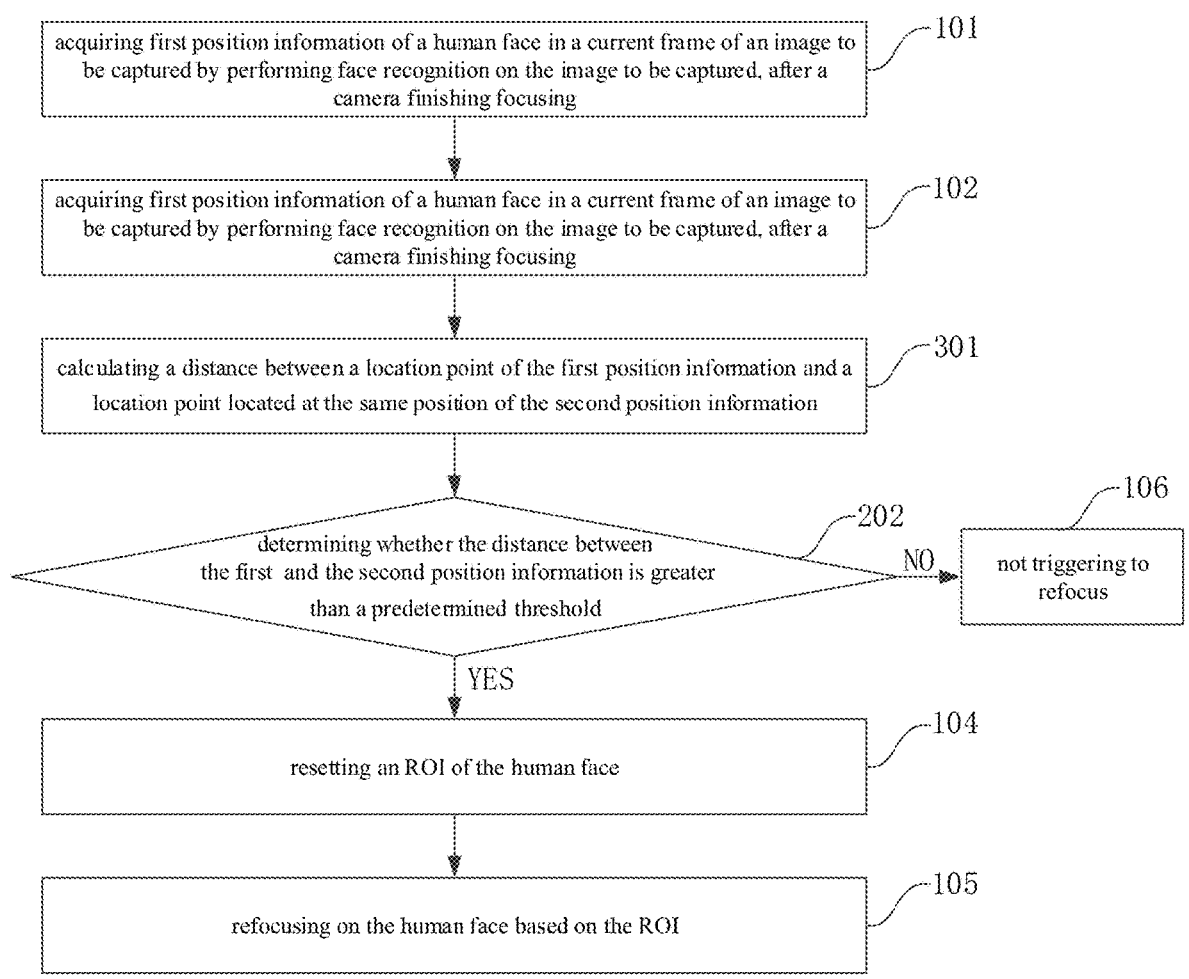
FIG. 3 is a flowchart of a focusing method for realizing a clear human face according to still another embodiment of the disclosure.

FIG. 3 is a flowchart of a focusing method for realizing a clear human face according to still another embodiment of the disclosure. As illustrated in FIG. 3, the step 201 of the embodiment as illustrated in FIG. 2 may refer to the following step.

Step 301, a distance between a location point of the first position information and a corresponding location point located at the same position of the second position information is calculated.

Specifically, the position information of the human face includes coordinates information of four points, which are the coordinates information of a location point at the upper left corner, the coordinates information of a location point at the lower left corner, the coordinates information of a location point at the upper right corner, and the coordinates information of a location point at the lower right corner. So, the distance between the first position information and the second position information can be represented by the distance between the location point of the first position information and the corresponding location point located at the same position of the second position information.

Assuming that the coordinates of the location point (e.g., the location point at the upper left corner) in the first position information are B1 (x1, y1), and the coordinates of the corresponding location point located at the same position of the second position information are B2 (x2, y2), then the distance between the location point of the first position information and the corresponding location point located at the same position of the second position information is calculated according to the formula (1).

$$l=\sqrt{(x1-x2)^2+(y1-y2)^2} \quad (1)$$

Where l refers to the distance between the location point of the first position information and the location point located at the same position of the second position information.

The distance between the first position information and the second position information exceeds a predetermined threshold may refers to: the distance between any one of the location points in the first position information and a corresponding location point located at the same position of the second position information exceeds a predetermined threshold.

In other words, the distance between each location point included in the first position information and the corresponding location point in the second position information is required to be calculated according to the formula (1). As long as the distance of one of the location points, between the first and second position information, exceeds the predetermined threshold, it can be determined that the distance between the first position information and the second position information is greater than the predetermined threshold.

Figure 4:
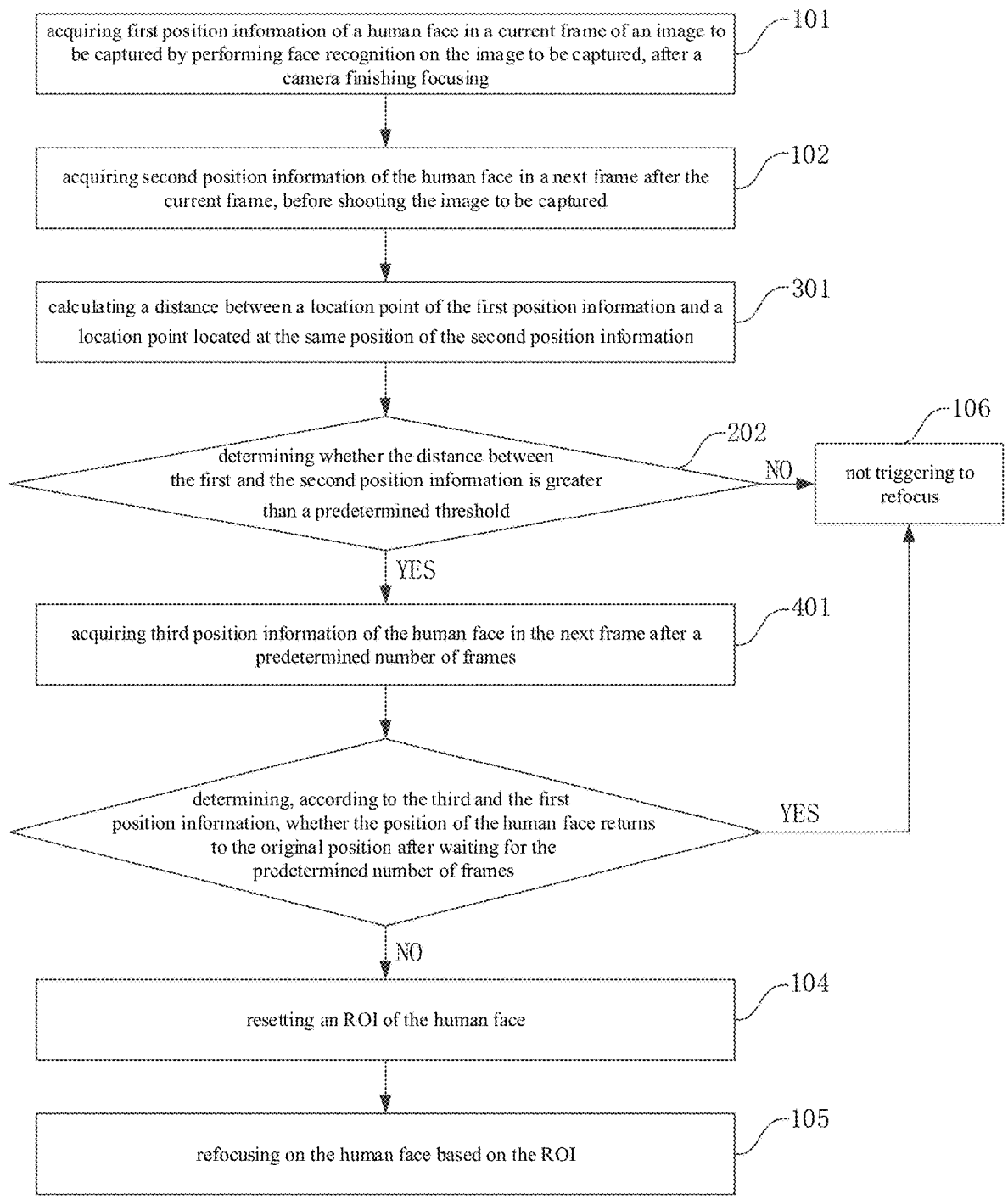
FIG. 4 is a flowchart of a focusing method for realizing a clear human face according to still another embodiment of the disclosure.

FIG. 4 is a flowchart of a focusing method for realizing a clear human face according to still another embodiment of the disclosure. As illustrated in FIG. 4, before the step 104, the method of the embodiment as illustrated in FIG. 1 may further include the following steps.

Step 401, third position information of the human face is acquired in a next frame which is after a predetermined number of frames.

The predetermined number may be set according to system performance and/or implementation requirements, and the specific predetermined number is not limited in the disclosure. For example, the predetermined number may be 3.

Step 402, it is determined whether the position of the human face is back to the original position indicated by the first position information after the predetermined number of frames, according to the third position information and the first position information.

If not, the step 104 is performed; if yes, after waiting for the predetermined number of frames, the position of the human face returns to the original position indicated by the first position information, then the step 106 is performed.

In the embodiment, the step 104 of resetting the ROI of the human face may refer to: resetting the ROI of the human face according to the third position information.

That is, in the embodiment, if it is determined that the position of the human face has been changed according to the first position information and the second position information, a certain time of a few frames (e.g., the predetermined number of frames) may be waited before the next operation. The reason for waiting for the time passed during a few frames is considering that the human face may unconsciously move back and forth when taking pictures.

If the human face returns to its original position within the certain time of these few frames, the camera will not be triggered to refocus, this speeds up shooting and reduces camera power consumption. If after the certain time of waiting for these few frames, the human face does not return to its original position, then it is required to reset the ROI of the human face according to the third position information, and the human face is refocused according to the ROI of the human face, so the human face can be tracked in real-time. When the position of the human face deviates from the previous focusing position, the camera is triggered to refocus, thereby make the human face in the taken photo clearer.

Figure 5:
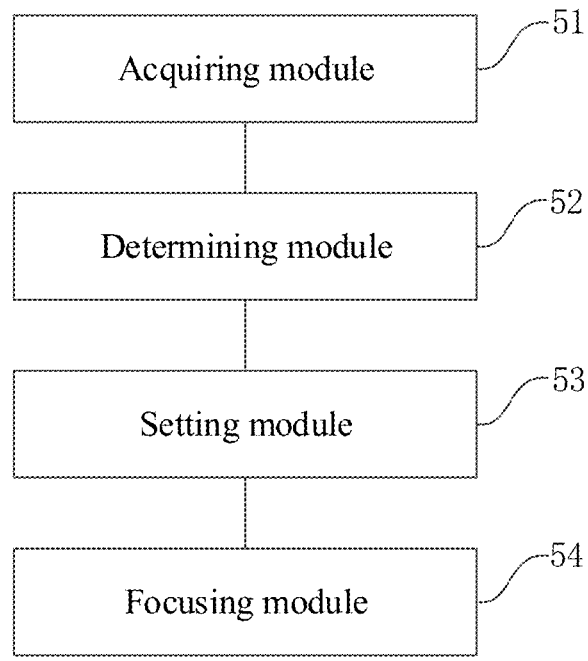
FIG. 5 is a schematic structural diagram of a focusing device for realizing a clear human face according to an embodiment of the disclosure.

FIG. 5 is a schematic structural diagram of a focusing device for realizing a clear human face according to an embodiment of the disclosure, and the focusing device for realizing a clear human face in the embodiment of the disclosure can be used as a computer device to implement the focusing method for realizing a clear human face provided by the embodiments of the disclosure. The computer device may be a smart phone, a tablet computer, or a camera, or the like. The computer device is not limited in the embodiment of the disclosure.

As illustrated in FIG. 5, the focusing device for realizing a clear human face focus may include an acquiring module 51, a determining module 52, a setting module 53, and a focusing module 54.

The acquiring module 51 is configured to acquire first position information of a human face in a current frame of the image to be captured by performing face recognition on the image to be captured, when a camera finishes focusing; and to acquire second position information of the human face in a next frame of the image to be captured after the current frame. In the embodiment, when the camera finishes focusing, the acquiring module 51 performs face recognition on the image to be captured, thereby to acquire the first position information of the human face in the current frame of the image to be captured. The first position information means location information of the area where the human face is located in the current frame. After focusing and before shooting, the acquiring module 51 is further configured to acquire the second position information of the human face in the next frame after the current frame. The second position information is location information of the area where the human face is located in the next frame.

The determining module 52 is configured to determine whether the position of the human face is changed or not, according to the first location information and the second location information acquired by the acquiring module 51.

The setting module 53 is configured to reset an ROI of the human face, when the determining module determines that the position of the human face is changed. Specifically, the setting module 53 is configured to reset the ROI of the human face according to the second position information.

The focusing module 54 is configured to focus the human face according to the ROI set by the setting module 53.

In the embodiment, when it is determined that the position of the human face changes according to the first position information and the second position information, the camera may be triggered to perform a refocusing operation. Specifically, the ROI of the human face may be reset according to the second position information, and then the human face is subjected to a focusing operation according to the ROI of the human face.

In the embodiment, a focusing mode may be a phase focusing, or a contrast focusing, or a combination of the phase focusing and the contrast focusing, the focusing mode adopted is not limited.

In the embodiment, if it is determined that the position of the human face does not change according to the first position information and the second position information, the camera may not be triggered to refocus.

In the above-mentioned focusing device for realizing a clear human face, when the camera finishes focusing, an image to be captured is subjected to face recognition, and first position information of a human face in a current frame of the image to be captured is acquired by the acquiring module 51. Before shooting the image to be captured, second position information of the human face in a next frame of the image to be captured is obtained, and the position of the human face changes or not is determined by the determining module 52, according to the first position information and the second position information. When the position of the human face changes, the ROI of the human face is reset by the setting module 53, according to the second position information, and the human face is refocused by the focusing module 54, according to the ROI of the human face. So, the human face can be tracked in real-time, and after the position of the human face deviates from a previous focusing position, the camera is triggered to refocus thereby to make the human face in a captured photo clear.

Figure 6:
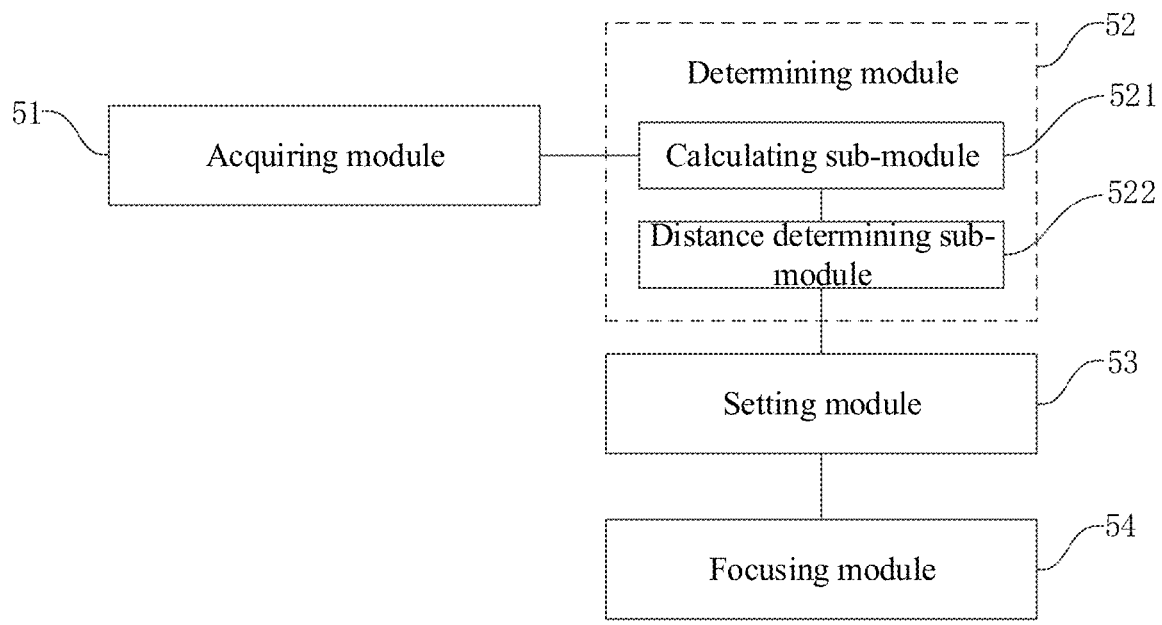
FIG. 6 is a schematic structural diagram of a focusing device for realizing a clear human face according to another embodiment of the disclosure.

FIG. 6 is a schematic structural diagram of a focusing device for realizing a clear human face according to another embodiment of the disclosure. Compared with the focusing device as illustrated in FIG. 5, the differences are that, a determining module 52 of the focusing device for realizing a clear face as shown in FIG. 6 may include a calculation sub-module 521 and a distance judging sub-module 522.

The calculation sub-module 521 is configured to calculate a distance between the first position information and the second position information.

The distance judging sub-module 522 is configured to determine whether the distance between the first position information and the second position information exceeds a predetermined threshold.

As such, the position of the human face changes may refer to that: the distance between the first position information and the second position information exceeds the predetermined threshold.

The predetermined threshold may be predetermined according to system performance and/or implementation requirements, for example, the predetermined threshold may be 0. In this case, as long as the position of the human face changes slightly, the camera will be triggered to refocus. In other cases, the predetermined threshold may also be a positive integer, when the position of the human face moves slightly, the camera will not be triggered to refocus. The specific numerical value of the predetermined threshold is not limited in the disclosure.

In the embodiment, the calculation sub-module 521 is specifically configured to calculate a distance between location points of the first position information and location points located at the same position of the second position information is calculated.

Specifically, the position information of the human face includes coordinates information of four points, which include the coordinates information of a location point at the upper left corner, the coordinates information of a location point at the lower left corner, the coordinates information of a location point at the upper right corner, and the coordinates information of a location point at the lower right corner. So, the distance between the first position information and the second position information can be represented by the distance between one of the location points in the first position information and the corresponding location point in the second position information.

Assuming that the coordinates of one the location points (e.g., the location point at the upper left corner) in the first position information are B1 (x1, y1), and the coordinates of the corresponding location point in the second position information are B2 (x2, y2), then the distance between the location point in the first position information and the location point in the second position information is calculated according to the formula (1).

$$l=\sqrt{(x1-x2)^2+(y1-y2)^2} \qquad (1)$$

Where l refers to the distance between the location point in the first position information and the corresponding location point in the second position information.

The distance between the first position information and the second position information exceeds the predetermined threshold may refers to: the distance between any one of the location points in the first position information and a corresponding location point in the second position information is greater than the predetermined threshold.

In other words, the distance of each of the location points, between the first and second position information, is required to be calculated according to the formula (1). As long as the distance of one of the location points is greater than the predetermined threshold, it can be determined that the distance between the first position information and the second position information is greater than the predetermined threshold.

In further, the acquiring module 51 is further configured to acquire third position information of the human face in a next frame which is after a predetermined number of frames, when the position of the human face changes before resetting the ROI of the human face by the setting module 53. The predetermined number may be set according to system performance and/or implementation requirements, and the specific predetermined number is not limited in the disclosure. For example, the predetermined number may be 3.

The determining module 52 is further configured to determine whether the position of the human face is back to the original position indicated by the first position information after the predetermined number of frames, according to the third position information and the first position information.

The setting module 53 is further configured to reset the ROI of the human face, if the position of the human face does not return to the original position after the determining module 52 determining that the predetermined number of frames have been waited for. In the embodiment, the setting module 53 is further configured to reset the ROI of the human face according to the third position information.

That is, in the embodiment, if the determining module 52 determines that the position of the human face has changed according to the first position information and the second position information, there may be a certain time for waiting for several frames (e.g., the predetermined number of frames). The reason for waiting for several frames is to consider unconsciously moving back and forth of the human face when taking pictures.

If the human face returns to its original position within the certain time of the several frames, the camera will not be triggered to refocus, thereby improving the shooting speed and reducing the camera power consumption. If after the certain time of waiting for several frames, the human face does not return to its original position, then the setting module 53 resets the ROI of the human face according to the third position information, and the focusing module 54 performs a refocusing on the human face according to the ROI of the human face, so the human face can be tracked in real-time. When the position of the human face deviates from the previous focusing position, the camera is triggered to refocus, thereby make the human face in the taken photo clearer.

Figure 7:
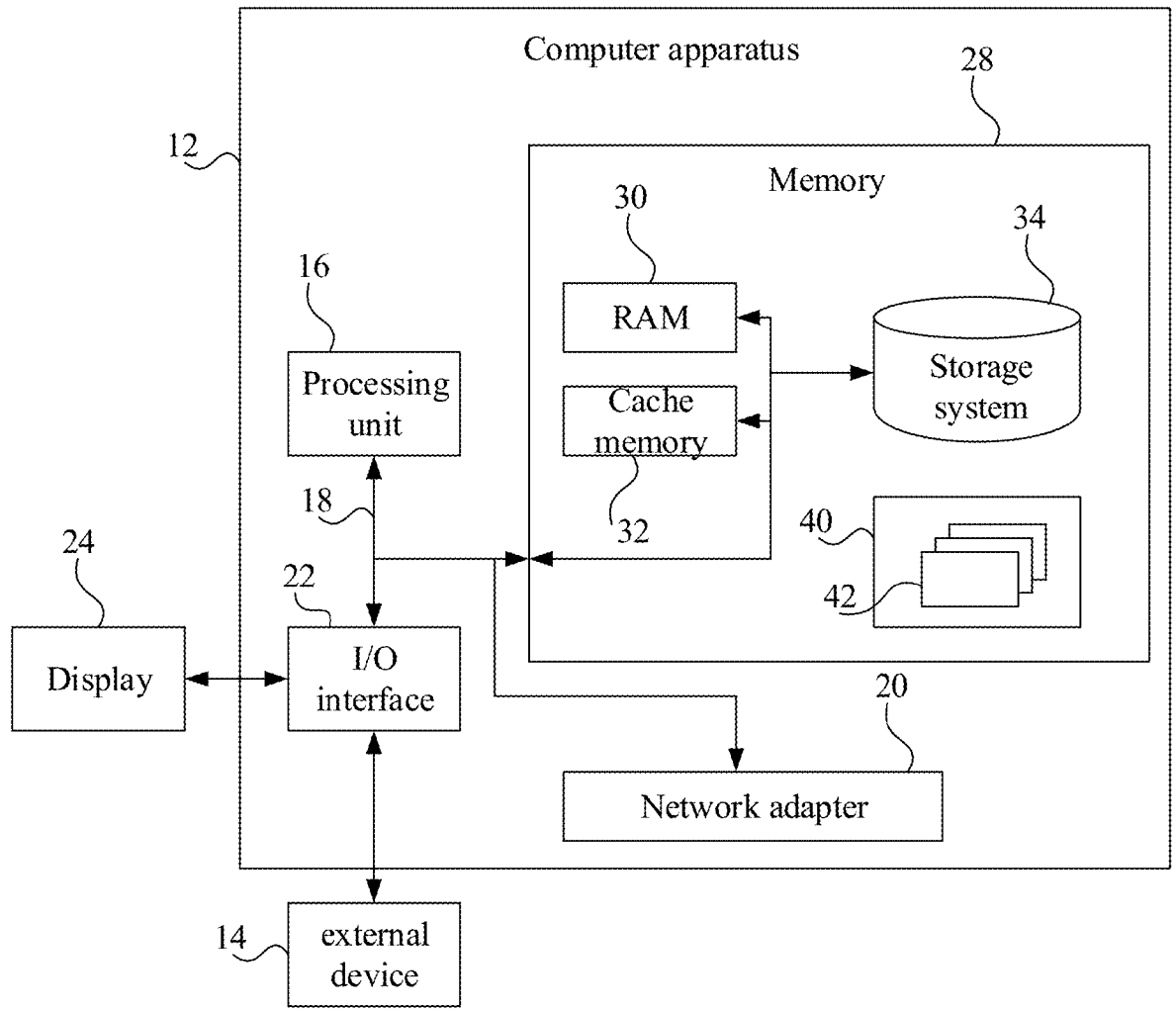
FIG. 7 is schematic structural diagram of a computer apparatus according to an embodiment of the disclosure.

FIG. 7 is a schematic structural diagram of an embodiment of a computer apparatus according to the disclosure. The computer apparatus in the embodiment may include a memory, a processor, and a computer program stored in the memory and executable by the processor, when the processor executes the computer program, the focusing method for realizing a clear human face provided by the embodiments of the disclosure is implemented.

The computer apparatus may be a smart phone, a tablet computer, a camera or the like. The form of the computer apparatus is not limited in the embodiment.

FIG. 7 illustrates a block diagram of an exemplary computer apparatus 12 suitable for implementing embodiments of the disclosure. The computer apparatus 12 shown in FIG. 7 is merely an example and should not impose any limitation on the function and scope of use of the embodiments of the disclosure.

As illustrated in FIG. 7, the computer apparatus 12 is embodied in the form of a general computing device. Components of computer apparatus 12 may include, but are not limited to, one or more processors or processing units 16, a system memory 28, and a system bus 18 connecting different components (including the system memory 28 and the processing units 16).

The system bus 18 represents one or more of several types of bus architectures, including a memory bus or a memory controller, a peripheral bus, a graphics acceleration port, a processor or a local bus using any type of a number of bus architectures. For example, these architectures include, but are not limited to, an Industry Standard Architecture (hereinafter referred to as ISA) bus, a Micro Channel Architecture (MAC) bus, an enhanced ISA bus, a Video Electronics Standards Association (hereinafter referred to as VESA) local bus and a Peripheral Component Interconnection (hereinafter referred to as PCI) bus.

The computer apparatus 12 typically includes a variety of computer system readable media. These media can be any available media that can be accessed by computer apparatus 12, including both volatile and nonvolatile media, removable and non-removable media.

The system memory 28 may include computer system readable media in the form of volatile memory, such as a random access memory (RAM) 30 and/or a cache memory 32. The computer apparatus 12 may further include other removable/non-removable, volatile/non-volatile computer system storage media. By way of example, a storage system 34 may be used to read and write non-removable, non-volatile magnetic media (not shown in FIG. 7, commonly referred to as "hard disk drives"), a disk drive for reading and writing to a removable non-volatile disk (such as a "floppy disk") also not shown in FIG. 7, and an optical driver configured to read and write removable non-volatile disk (e.g., a compact disk read-only memory, referred to as CD-ROM), Digital Video Disc Read Only Memory (DVD-ROM), or other optical media. In these cases, each drive can be coupled to the system bus 18 via one or more data medium interfaces. The system memory 28 can include at least one program product, which has a set (e.g., at least one) of program modules configured to perform the functions of the various embodiments of the disclosure.

A program/application tool 40 having a set (at least one) of program modules 42, may be stored, for example, in the memory 28. Such program modules 42 include, but is not limited to, an operating system, one or more applications, other programs modules and program data, each of these examples or some combination may include an implementation of a network environment. The program modules 42 typically perform the functions and/or methods of the embodiments described in the disclosure.

The computer apparatus 12 may also be in communication with one or more external devices 14 (e.g., a keyboard, a pointing device, a display 24, etc.), and may also be in communication with one or more devices that enable a user to interact with the computer apparatus 12, and/or any device (e.g., a network card, a modem, etc.) that enables the computer apparatus 12 to communicate with one or more other computing apparatuses. Such communication can take place via input/output (I/O) interfaces 22. Moreover, the computer apparatus 12 can also communicate with one or more networks (e.g., a local area network, referred to as LAN; a wide area network, referred to as WAN), and/or a public network, such as the Internet) by one or more network adapters 20. As illustrated in FIG. 7, the network adapter 20 communicates with other modules of the computer apparatus 12 via the system bus 18. Although not shown in FIG. 7, other hardware and/or software modules may be utilized with the computer apparatus 12, including but not limited to: microcodes, device drivers, redundant processing units, external disk drive arrays, RAID systems, tapes drivers and data backup storage systems, etc.

The processing units 16 perform various function applications and data processing by running programs stored in the system memory 28, for example, implement the focusing method for realizing a clear human face provided by the embodiments of the disclosure.

The embodiment of the disclosure further provides a non-transitory computer readable storage medium, on which a computer program is stored, and when the computer program is executed by the processor or the processing unit 16, the focusing method for realizing a clear human face provided by the embodiments of the disclosure is implemented.

The above non-transitory computer readable storage medium may employ any combination of one or more computer readable media. The computer readable medium can be a computer readable signal medium or a computer readable storage medium. The computer readable storage medium can be, for example, but not limited to, an electronic, magnetic, optical, electromagnetic, infrared, or semiconductor system, apparatus, or device, or any combination of the above. More specific examples (non-exhaustive lists) of computer readable storage media include: electrical connections with one or more wires, portable computer disks, hard disks, random access memory (RAM), read only memory (ROM), Erasable Programmable Read Only Memory (EPROM) or flash memory, optical fiber, portable compact disk read only memory (CD-ROM), optical storage device, magnetic memory pieces, or any suitable combination of the above. In the document, the computer readable storage medium can be any tangible medium that can contain or store a program, which can be used by or in connection with an instruction execution system, apparatus or device.

The computer readable signal medium may include data signals that are propagated in the baseband or as part of a carrier, carrying computer readable program codes. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device.

Program codes embodied in the computer readable medium can be transmitted by any suitable medium, including but not limited to wireless, wire, fiber optic cable, RF, or any suitable combination of the foregoing.

The computer program codes for performing the operations of the disclosure may be written in one or more programming languages, or a combination thereof, including an object oriented programming language such as Java, Smalltalk, C++, and conventional Procedural programming language—such as the "C" language or a similar programming language. The program codes may execute entirely on the user's computer, partly on the user's computer, as a stand-alone software package, partly on the user's computer and partly on a remote computer, or entirely on the remote computer or a server. In the case of regarding the remote computer, the remote computer can be connected to the user computer through any kind of network, including a local area network (LAN) or a wide area network (WAN), or can be connected to an external computer (e.g., using an Internet service provider via the Internet).

The embodiment of the disclosure further provides a computer program product, which implements a focusing method for realizing a clear human face provided by embodiments of the disclosure when instructions in the computer program product are executed by a processor.

In the disclosure, the description with reference to the terms "one embodiment", "some embodiments", "example", "specific example", or "some examples" and the like means specific features, structures, materials, or characteristics described in connection with the embodiment or the example are included in at least one embodiments or examples of the disclosure. In the present specification, the schematic representation of the above terms is not necessarily directed to the same embodiment or example. Furthermore, the particular features, structures, materials, or characteristics described may be combined in a suitable manner in any one or more embodiments or examples. In addition, those skilled in the art can combine the features of the various embodiments or examples described in the specification without departing from the scope of the disclosure.

Moreover, the terms "first" and "second" are used for descriptive purposes only and are not to be construed as indicating or implying a relative importance or implicitly indicating the number of technical features indicated. Thus, the features with "first" or "second" may include at least one of the features, either explicitly or implicitly. In the description of the disclosure, the meaning of "a plurality" is at least two, such as two, three, etc., unless specifically defined otherwise.

Any process or method description in the flowcharts or other manners may be understood to represent a module, segment or portion of codes comprising one or more executable instructions for implementing the steps of logic functions or processes. And the scope of the preferred embodiments of the disclosure includes additional implementations, in which the functions may be performed to execute functions, in accordance with the illustrated or discussed order, including a substantially same order or a reverse order depending on the functions involved. It will be understood by those skilled in the art to which the embodiments of the disclosure pertain.

The logic and/or steps represented in the flowchart or other manners described herein, for example, may be considered as an ordered list of executable instructions for implementing logical functions, and may be embodied in any computer readable medium, used in an instruction executing system, apparatus, or device (e.g., a computer-based system, a system including a processor, or other system that can fetch and execute instructions from an instruction executing system, apparatus, or device), or used in conjunction with such instruction executing system, apparatus, or device. For this specification, the "computer-readable medium" can be any apparatus that can contain, store, communicate, propagate, or transport a program for use in an instruction executing system, apparatus, or device, or in conjunction with such instruction executing system, apparatus, or device. More specific examples (non-exhaustive list) of computer readable media may include the following: electrical connections (electronic devices) having one or more wires, portable computer disk cartridges (magnetic devices), random access memory (RAM), Read Only Memory (ROM), Erasable Programmable Read Only Memory (EPROM) or flash memory, fiber optic devices, and Compact Disc Read Only Memory (CD-ROM). In addition, the computer readable medium may even be a paper or other suitable medium on which the program can be printed, as it may be optically scanned, followed by editing, interpretation or, if appropriate, other suitable processing method to obtain the program in an electronical way and then stored in computer memory.

It should be understood that every portion of the application can be implemented in hardware, software, firmware, or a combination thereof. In the above-described embodiments, multiple steps or methods may be implemented in software or firmware stored in a memory and executed by a suitable instruction executing system. For example, if implemented in hardware and in another embodiment, it can be implemented by any one or combination of the following techniques well known in the art: discrete with logic gates for implementing logic functions on data signals logic circuit, ASIC with suitable combination logic gate, Programmable Gate Array (PGA), Field Programmable Gate Array (FPGA), or the like.

One of ordinary skill in the art can understand that all or part of the steps carried by the method of implementing the above embodiments can be completed by a program to instruct related hardware, and the program can be stored in a computer readable storage medium, when executing, one step or a combination of the steps of the method embodiment is included.

In addition, each functional unit in each embodiment of the disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as stand-alone products, may also be stored in a computer readable storage medium.

The above mentioned storage medium may be a read only memory, a magnetic disk or an optical disk or the like. The embodiments of the disclosure have been shown and described above, it is understood that the above-described embodiments are illustrative and are not to be construed as limiting the scope of the present disclosure. Variations, modifications, equivalents and improvements of the above-described embodiments may be made by those skilled in the art within the scope of the present disclosure.

What is claimed is:

1. A focusing method for realizing a clear human face, comprising:
   acquiring first position information of a human face in a current frame of an image to be captured by performing face recognition on the image to be captured in response to a camera finishing focusing;
   acquiring second position information of the human face in a next frame after the current frame;
   determining whether a position of the human face in the image to be captured changes, according to the first position information and the second position information;
   acquiring third position information of the human face in another next frame which is after a predetermined period of time from the current frame, in response to the change of the position of the human face in the image to be captured;
   determining, according to the third position information and the first position information, whether the position of the human face in the another next frame returns to the position indicated by the first position information;
   resetting a region of interest (ROI) of the human face when it is determined that the position of the human face in the another next frame does not return to the position indicated by the first position information; and
   refocusing on the human face based on the ROI.

2. The method according to claim 1, wherein the determining whether a position of the human face changes according to the first position information and the second position information comprises:
   calculating a distance between the first position information and the second position information; and
   determining whether the distance between the first position information and the second position information is greater than a predetermined threshold.

3. The method according to claim 2, wherein calculating a distance between the first position information and the second position information comprises:
   calculating a distance between a location point of the first position information and a location point located at a same position of the second position information.

4. The method according to claim 1, wherein the resetting of the ROI of the human face comprises:
   resetting the ROI of the human face based on the third position information.

5. The method according to claim 3, wherein coordinates of the location point in the first position information are (x1, y1), coordinates of the corresponding location point in the second position information are (x2, y2), then the distance between the location point in the first position information and the corresponding location point in the second position information is calculated according to the formula:

$$\text{distance} = \sqrt{(x1-x2)^2+(y1-y2)^2}.$$

6. The method according to claim 2, wherein the first position information comprises a plurality of first location points, and the second position information comprises a plurality of second location points corresponding to the plurality of first location points one by one,
   wherein calculating a distance between the first position information and the second position information comprises:
   calculating a distance between each of the plurality of first location points and the corresponding second location point.

7. The method according to claim 6, wherein the distance between the first position information and the second position information is greater than the predetermined threshold comprises: the distance, between any one of the first location points of the first position information and the corresponding second location point of the second position information, is greater than the predetermined threshold.

8. The method according to claim 1, wherein the refocusing operation is not triggered in response to that the position of the human face in the another next frame of the image to be captured returns to the position indicated by the first position information.

9. The method according to claim 1, wherein the refocusing operation is not triggered in response to that the position of the human face does not change according to the first position information and the second position information.

10. A computer apparatus, comprising a memory, a processor, and a computer program stored in the memory and executable by the processor, wherein a focusing method is performed when executing the computer program, and the focusing method comprises:
   determining whether a preview image comprises a human face after focusing;
   performing face recognition on the human face in a current frame of the preview image to obtain a first position of the human face, in response to that the preview image comprises the human face, wherein the first position comprises a plurality of first location points;

acquiring a second position of the human face in a next frame of the preview image, wherein the second position comprises a plurality of second location points corresponding to the plurality of first location points one by one;

calculating a distance between each of the plurality of first location points and the corresponding second location point;

determining whether any one of the calculated distances is greater than a predetermined threshold;

resetting a ROI of the human face, in response to that any one of the calculated distances is determined to be greater than the predetermined threshold; and refocusing on the human face based on the ROI.

11. The computer apparatus according to claim 10, wherein coordinates of the location point in the first position are (x1, y1), coordinates of the corresponding location point in the second position are (x2, y2), then the distance between the location point of the first position and the corresponding location point of the second position is calculated according to the formula:

$$distance=\sqrt{(x1-x2)^2+(y1-y2)^2}.$$

12. The computer apparatus according to claim 10, wherein the resetting of the ROI of the human face comprises:

acquiring a third position of the human face in another next frame which is after a predetermined period of time from the current frame in response to that any one of the calculated distances is greater than the predetermined threshold;

determining, according to the third position and the first position, whether the human face in the another next frame of the image to be captured returns to the first position; and resetting, based on the third position, the ROI of the human face when it is determined that the human face in the another next frame of the image to be captured does not return to the first position.

13. The computer apparatus according to claim 12, wherein the refocusing operation is not triggered in response to that the human face in the another next frame of the image to be captured returns to the first position.

14. The computer apparatus according to claim 10, wherein the resetting of the ROI of the human face comprises:

acquiring a third position of the human face in another next frame which is after a predetermined number of frames from the current frame when any one of the calculated distances is determined to be greater than the predetermined threshold;

determining, according to the third position and the first position, whether the human face in the another next frame of the image to be captured returns to the first position; and resetting, based on the third position, the ROI of the human face when it is determined that the human face in the another next frame of the image to be captured does not return to the first position.

15. A focusing method, comprising:

acquiring a first frame of a preview image, the preview image comprising a human face;

performing face recognition on the human face in the first frame of the preview image to obtain a first position of the human face, wherein the first position comprises a plurality of first location points;

acquiring a second position of the human face in a second frame of the preview image after the first frame, wherein the second position comprises a plurality of second location points corresponding to the plurality of first location points one by one;

determining whether a distance between the first position and the second position is greater than a predetermined threshold, comprising:

calculating a distance between each of the plurality of first location points and the corresponding second location point;

determining whether any one of the calculated distances is greater than the predetermined threshold;

resetting a ROI of the human face in response to that any one of the calculated distances is determined to be greater than the predetermined threshold; and refocusing on the human face based on the ROI.

16. The method according to claim 15, wherein the resetting of the ROI of the human face comprises:

resetting the ROI of the human face based on the second position information.

17. The method according to claim 15, wherein coordinates of the location point in the first position are (x1, y1), coordinates of the corresponding location point in the second position are (x2, y2), then the distance between the location point in the first position and the corresponding location point in the second position is calculated according to the formula:

$$distance=\sqrt{(x1-x2)^2+(y1-y2)^2}.$$

18. The method according to claim 15, wherein the second frame is after more than one frame from the first frame.

19. The method according to claim 15, wherein the resetting of the ROI of the human face comprises:

acquiring a third position of the human face in another next frame which is after a predetermined period of time from the current frame in response to that any one of the calculated distances is greater than the predetermined threshold;

determining, according to the third position and the first position, whether the human face in the another next frame of the image to be captured returns to the first position; and resetting, based on the third position, the ROI of the human face when it is determined that the human face in the another next frame of the image to be captured does not return to the first position.

20. The method according to claim 15, wherein the resetting of the ROI of the human face comprises:

acquiring a third position of the human face in another next frame which is after a predetermined number of frames from the current frame when any one of the calculated distances is determined to be greater than the predetermined threshold;

determining, according to the third position and the first position, whether the human face in the another next frame of the image to be captured returns to the first position; and resetting, based on the third position, the ROI of the human face when it is determined that the human face in the another next frame of the image to be captured does not return to the first position.

* * * * *